(12) United States Patent
Takahashi (10) Patent No.: US 10,661,349 B2
(45) Date of Patent: May 26, 2020

(54) MACHINE TOOL AND METHOD FOR PROCESSING BY MACHINE TOOL

(71) Applicants: CITIZEN WATCH CO., LTD., Tokyo (JP); CITIZEN MACHINERY CO., LTD., Nagano (JP)

(72) Inventor: Hikaru Takahashi, Nagano (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 15/775,681

(22) PCT Filed: Nov. 10, 2016

(86) PCT No.: PCT/JP2016/083431
§ 371 (c)(1),
(2) Date: May 11, 2018

(87) PCT Pub. No.: WO2017/086238
PCT Pub. Date: May 26, 2017

(65) Prior Publication Data
US 2018/0369920 A1 Dec. 27, 2018

(30) Foreign Application Priority Data
Nov. 17, 2015 (JP) .................. 2015-225100

(51) Int. Cl.
| B23B 1/00 | (2006.01) |
| B23B 5/36 | (2006.01) |
| B23Q 15/12 | (2006.01) |
| B23Q 15/00 | (2006.01) |
| G05B 19/18 | (2006.01) |
| B23B 29/034 | (2006.01) |

(52) U.S. Cl.
CPC .................. *B23B 1/00* (2013.01); *B23B 5/36* (2013.01); *B23B 29/03482* (2013.01);
(Continued)

(58) Field of Classification Search
CPC ....... B23B 1/00; B23B 29/03482; B23B 5/36; B23Q 15/00; B23Q 15/12;
(Continued)

(56) References Cited

U.S. PATENT DOCUMENTS 3,593,603 A * 7/1971 Gellert ...................... B23B 5/36
408/54
4,154,555 A * 5/1979 Skrentner ......... B23B 29/03482
29/27 C (Continued)

FOREIGN PATENT DOCUMENTS

| CN | 101513719 A | 8/2009 |
| CN | 103648690 | 3/2014 |

(Continued)

OTHER PUBLICATIONS

Chinese Office Action dated Mar. 15, 2019; JP Application No. 201680065208.9; 14 pages.

*Primary Examiner* — Sara Addisu
(74) *Attorney, Agent, or Firm* — Knobbe, Martens, Olson & Bear LLP (57) ABSTRACT

An automatic lathe includes a main spindle that rotates a workpiece about a shaft center, a cutting tool that processes the workpiece, a feeder that moves the cutting tool, an input receiver that receives inputs regarding an eccentric distance and a radius, and a controller that controls the movement by the feeder such as to set a virtual circle having a radius of the distance, to set an offset virtual circle having a center at a position where a center of the virtual circle is offset from the shaft center of the workpiece in the radial direction of the workpiece by the radius, and to move the cutting tool along an circumference of the offset virtual circle in relation to a rotation of the workpiece by the main spindle. A hole is processed, which has the radius at a position away from the shaft center by the distance.

7 Claims, 7 Drawing Sheets

(52) U.S. Cl.
CPC ............. *B23Q 15/00* (2013.01); *B23Q 15/12* (2013.01); *G05B 19/18* (2013.01); *G05B 19/182* (2013.01); *G05B 2219/35157* (2013.01); *G05B 2219/45129* (2013.01); *G05B 2219/45215* (2013.01); *G05B 2219/50216* (2013.01)

(58) Field of Classification Search
CPC ........ G05B 2219/45129; G05B 19/182; G05B 2219/35157; G05B 2219/45215; G05B 2219/50216
See application file for complete search history.

(56) References Cited

U.S. PATENT DOCUMENTS

| | | | |
|---|---|---|---|
| 5,396,821 A | 3/1995 | Okumura et al. | |
| 5,419,223 A * | 5/1995 | Kubler | B23B 1/00 82/118 |
| 2002/0189412 A1* | 12/2002 | Ishida | B23B 29/03482 82/1.2 |
| 2007/0097492 A1* | 5/2007 | Takasu | B23B 1/00 359/362 |
| 2009/0214313 A1 | 8/2009 | Kato et al. | |
| 2014/0202294 A1 | 7/2014 | Takahashi | |

FOREIGN PATENT DOCUMENTS

| | | | | |
|---|---|---|---|---|
| EP | 2090389 A1 | | 8/2009 | |
| JP | 58040205 A | * | 3/1983 | ............... B23B 1/00 |
| JP | 5-305501 A | | 11/1993 | |
| JP | 05305501 A | * | 11/1993 | ............... B23B 1/00 |
| JP | 10-151501 A | | 6/1998 | |
| JP | 2002-66802 A | | 8/2000 | |
| JP | 2002-144106 A | | 5/2002 | |
| JP | 2009-190157 A | | 8/2009 | |
| JP | 2009190157 A | * | 8/2009 | ....... B23B 29/03482 |

* cited by examiner

MACHINE TOOL AND METHOD FOR PROCESSING BY MACHINE TOOL

CROSS-REFERENCE TO RELATED APPLICATION

The present application is based on and claims priority from Japanese Patent Application No. 2015-225100, filed on Nov. 17, 2015, the disclosure of which is hereby incorporated by reference in its entirety.

TECHNICAL FIELD

This disclosure relates to a machine tool and a method for processing by the machine tool.

BACKGROUND ART

A machine tool such as a lathe includes a main spindle. The main spindle holds a piece to be processed (referred to a workpiece hereinafter) such as a round bar which extends from the tip of the main spindle. The machine tool processes the workpiece by rotating the workpiece about its shaft center and by contacting a tool such as a tool bit or cutting tool to the workpiece. The tool is moved by a feeder. Then, a controller controls the rotation and/or axial movement of the workpiece, and the movement of tools by the feeder.

The tool is moved in relation to the rotation of the workpiece to form a portion radially eccentric from the shaft center of the workpiece (referred to an eccentric portion hereinafter) in the workpiece by such a machine tool, (See, Patent Literature 1: JP 2002-066802A, for example).

In the turning process for the eccentric position by the lathe disclosed in Patent Literature 1, it is necessary to control a NC lathe with a complicated program which uses positional data obtained by calculating the positions of the tool point by point.

The present disclosure is made in light of the above, and a main object of the present disclosure is to provide a machine tool and a method for processing by the machine tool which can process an eccentric shape or portion with simple settings.

Solution to Problem

According to the present disclosure, a machine tool includes a main spindle configured to rotate a workpiece about a shaft center thereof, a tool configured to process the workpiece, a feeder configured to move the tool, an input receiver configured to receive an input regarding an eccentric distance D and a radius R, and a controller configured to control the movement of the tool by the feeder such as to set a virtual circle having a radius of the distance D the input receiver receives, to set an offset virtual circle having a center at a position in which a center of the virtual circle is offset from the shaft center of the workpiece by the radius R the input receiver receives in the radial direction of the workpiece, and to move the tool along an circumference of the offset virtual circle in relation to a rotation of the workpiece by the main spindle. The machine tool processes an eccentric portion having the radius R and a center at a position eccentric from a shaft center of the workpiece by the distance D.

According to the present disclosure, a method for processing an eccentric portion in a workpiece by a machine tool includes receiving an input regarding a distance D between a shaft center of the workpiece and a center of the eccentric portion, and a radius R of the eccentric portion, setting a virtual circle having a radius of the received distance D, setting an offset virtual circle in which a center of the virtual circle is offset from the shaft center of the workpiece by the received radius R in the radial direction of the workpiece, moving a tool in a direction perpendicular to the shaft center of the workpiece that is rotated about the shaft center by a main spindle of the machine tool, and moving the tool along an circumference of the offset virtual circle in relation to a rotation of the workpiece by the main spindle.

DETAILED DESCRIPTION

Hereinafter, an embodiment of a machine tool and a method for processing by the machine tool will be described with reference to the accompanying drawings.

Configuration of Automatic Lathe

Figure 1:
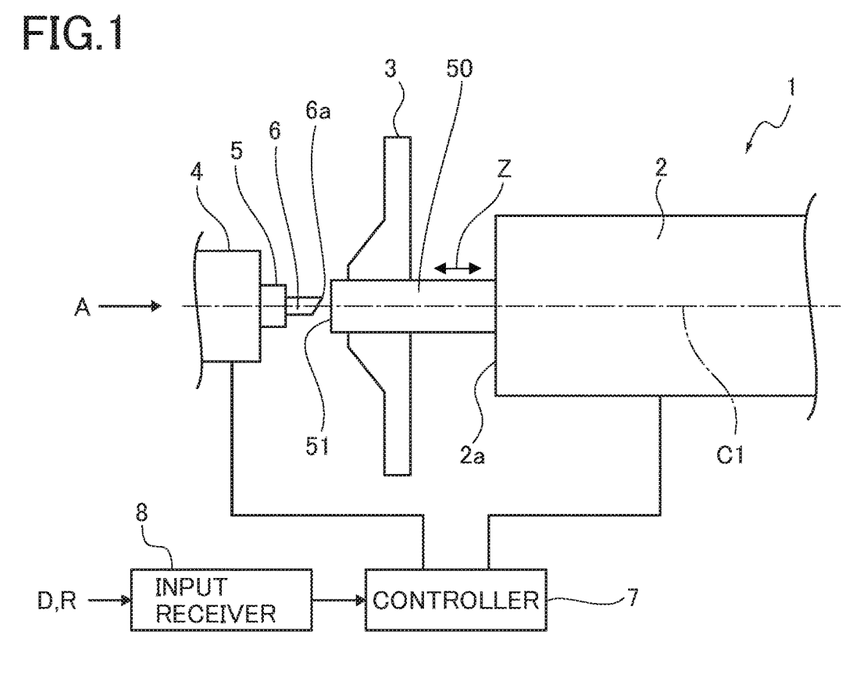
FIG. 1 is a schematic view illustrating an automatic lathe according to an embodiment of the present disclosure.
Figure 2:
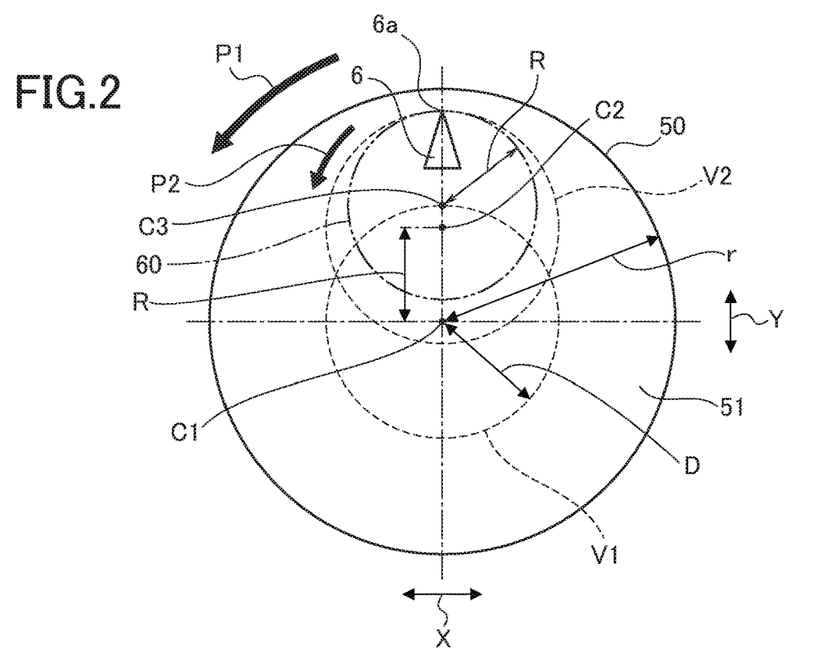
FIG. 2 is a front view illustrating a tip surface of a workpiece seen from a side indicated with an arrow A shown in FIG. 1.

FIG. 1 is a schematic view illustrating an automatic lathe (NC (Numerical Control) lathe) 1 which is an embodiment of a machine tool according to the present disclosure. FIG. 2 is a front view of a tip surface 51 of a workpiece 50 seen from a side shown with an arrow A in FIG. 1.

As shown in FIG. 1, an automatic lathe 1 according to an embodiment of the present disclosure includes a main spindle 2. The main spindle 2 is configured to hold a workpiece 50. The workpiece 50 to be turned and cut is in the shape of a bar. The main spindle 2 is configured to be controlled by a NC program and to move the workpiece 50 in a Z-direction along a shaft center C1 of the workpiece 50 while turning the workpiece 50 about the shaft center C1. The automatic lathe 1 also includes a guide bush 3 which holds the workpiece 50 at a position away from a tip 2a of the main spindle 2 in the Z-direction by contacting an outer surface of the workpiece 50 which extends from the main spindle 2.

The automatic lathe 1 includes a tool holder 5 and a feeder 4. The tool holder 5 holds a tool bit or cutting tool 6 (an example of a tool). The feeder 4 is configured to move the tool holder 5 in two directions (a X-direction, a Y-direction: see FIG. 2) which are perpendicular to each other within a plane which is perpendicular to the Z-direction. The cutting tool 6 includes a cutting edge 6a at a tip thereof. The cutting tool 6 is configured to process the workpiece 50 by the cutting edge 6a contacting the workpiece 50 which extends from the guide bush 3 in the Z-direction. The turning process to the workpiece 50 is a boring process to form a hole 60 which is recessed from a tip surface 51 in the Z-direction.

The hole 60 is a cylindrical space formed into the tip surface 51. The hole 60 has a circular cross section and the circle of the hole 60 has a center C3 and a radius R. The center C3 is at a position eccentric from the shaft center C1 of the workpiece 50 by a distance D in the radial direction. Note that in this embodiment, a radius r of the workpiece 50, the distance D of the eccentricity, and the radius R of the hole 60 satisfy a magnitude relationship (D+R)<r.

The automatic lathe 1 includes an input receiver 8 that is configured to receive inputs regarding the distance D and the radius R. The automatic lathe 1 includes a controller 7 that is configured to control the rotation of the main spindle 2, the movement of the main spindle 2 in the Z-direction, and the movement by the feeder 4 in accordance with the NC program set based on the distance D and the radius R received by the input receiver 8.

Specifically, the NC program sets a virtual circle V1 and an offset virtual circle V2 as shown in FIG. 2. The virtual circle V1 has a radius of the distance D. The offset virtual circle V2 has a center C2 at a position where a center of the virtual circle V1 is offset from the shaft center C1 of the workpiece 50 by the radius R in the radial direction of the workpiece 50. In addition, the NC program sets the cutting edge 6a to move along the circumference of the offset virtual circle V2 in a rotational direction P2 synchronized with the rotation of the workpiece 50 about the shaft center C1 in a rotational direction P1.

(Operation of Automatic Lathe)

Now, the operation of the automatic lathe 1 (a method for processing or machining by the automatic lathe 1) will be described. First, the input receiver 8 receives inputs regarding the distance D and the radius R made by an operator. The controller 7 rewrites or translates the inputs regarding distance D and radius R to the NC program. Thereby, the NC program sets the virtual circle V1 having the radius of the distance D and the offset virtual circle V2 having the center C2 at the position where the center of the virtual circle V1 is offset from the shaft center C1 of the workpiece 50 by the radius R in the radial direction of the workpiece 50 as shown in FIG. 2.

The NC program calculates a coordinate position (x, y) of the cutting edge 6a at each rotational position of the workpiece 50 such that when the workpiece 50 is rotated about the shaft center C1 in the rotational direction P1 at constant angular velocity, the cutting edge 6a turns or moves along the circumference of the offset virtual circle V2 in the rotational direction P2 synchronized with the rotation of the workpiece 50.

FIG. 3A, FIG. 3B, FIG. 3C, FIG. 3D, FIG. 3E and FIG. 3F are front views, each of which corresponds to FIG. 2, illustrating the positional relation between the cutting edge 6a and the workpiece 50 set by the NC program. The controller 7 controls the main spindle 2 to rotate the workpiece 50 about the shaft center C1 in the rotational direction P1 at constant angular velocity, and also controls the feeder 4 such that the cutting edge 6a moves to the coordinate position (x, y) at each rotational position of the workpiece 50 set by the NC program as shown in FIG. 3A to FIG. 3F.

Figure 3A:
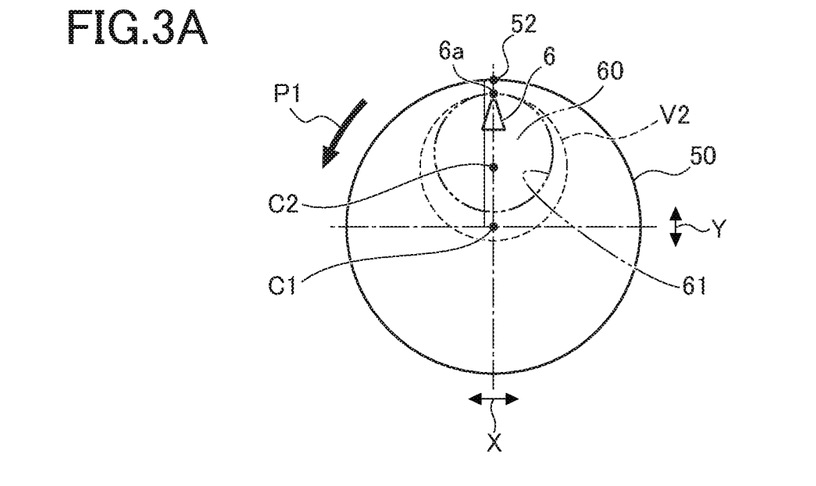
FIG. 3A is a front view, which corresponds to FIG. 2, illustrating the positional relation between a cutting edge of a cutting tool and the workpiece set by a NC program, and illustrating a state in which the cutting tool has moved to, for example, a twelve o'clock position (the highest position in a height direction shown in the figure) on the circumference of an offset virtual circle.
Figure 3B:
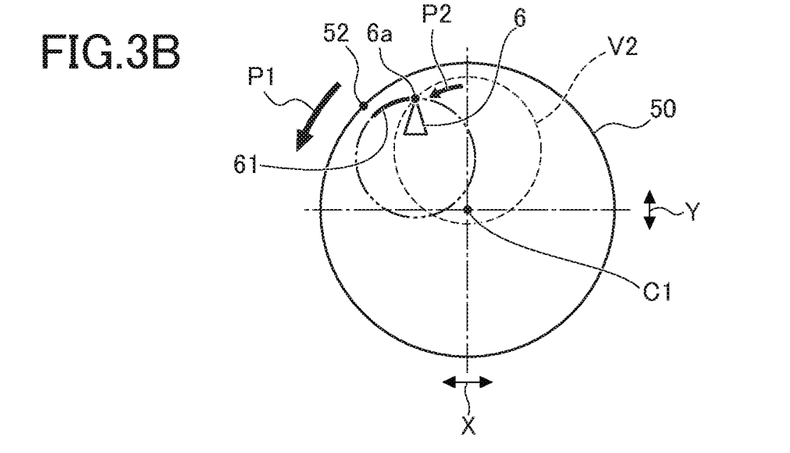
FIG. 3B is a front view, which corresponds to FIG. 2, illustrating the positional relation between the cutting edge of the cutting tool and the workpiece set by the NC program, and illustrating a state in which the cutting tool has moved to, for example, a ten o'clock and half position on the circumference of the offset virtual circle.
Figure 3C:
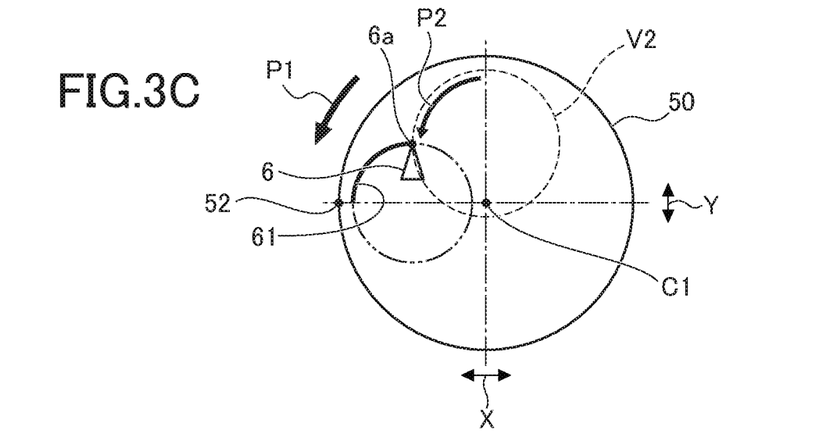
FIG. 3C is a front view, which corresponds to FIG. 2, illustrating the positional relation between the cutting edge of the cutting tool and the workpiece set by the NC program, and illustrating a state in which the cutting tool has moved to, for example, a nine o'clock position (a left end position in a left-right direction shown in the figure) on the circumference of the offset virtual circle.
Figure 3D:
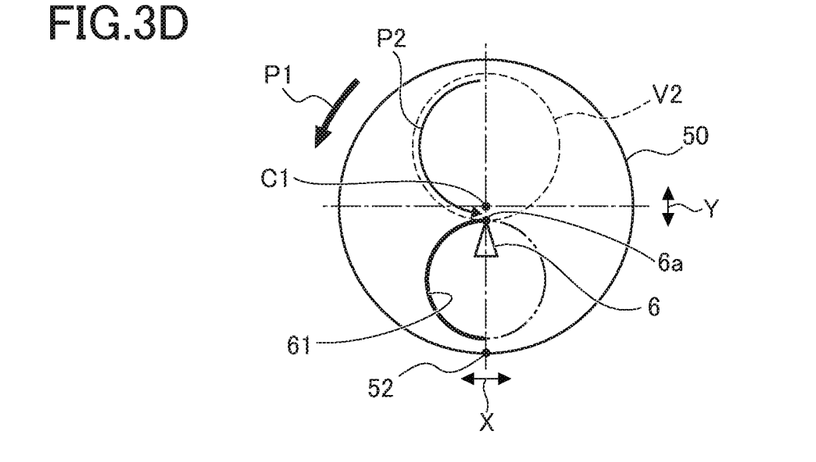
FIG. 3D is a front view, which corresponds to FIG. 2, illustrating the positional relation between the cutting edge of the cutting tool and the workpiece set by the NC program, and illustrating a state in which the cutting tool has moved to, for example, a six o'clock position (the lowest position in the height direction shown in the figure) on the circumference of the offset virtual circle.
Figure 3E:
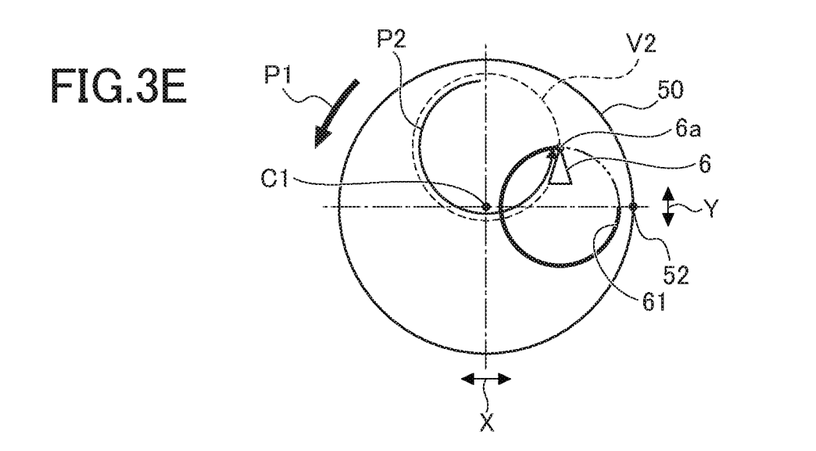
FIG. 3E is a front view, which corresponds to FIG. 2, illustrating the positional relation between the cutting edge of the cutting tool and the workpiece set by the NC program, and illustrating a state in which the cutting tool has moved to, for example, a three o'clock position (a right end position in the left-right direction shown in the figure) on the circumference of the offset virtual circle.
Figure 3F:
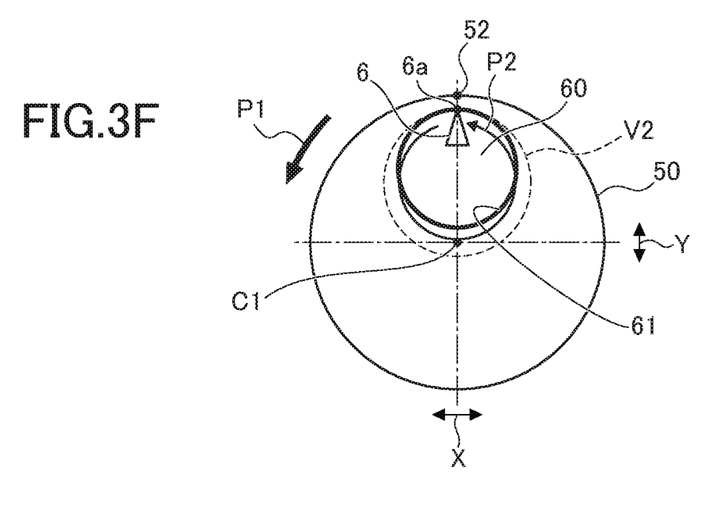
FIG. 3F is a front view, which corresponds to FIG. 2, illustrating the positional relation between the cutting edge of the cutting tool and the workpiece set by the NC program, and illustrating a state in which the cutting tool has moved to, for example, the twelve o'clock position on the circumference of the offset virtual circle.

Specifically, as shown in FIG. 3A, the controller 7 controls the feeder 4 to move the cutting edge 6a to a position, for example a twelve o'clock position (the highest position in a height direction shown in the figure), on the circumference of the offset virtual circle V2 at a moment during the rotation of the workpiece 50 in the rotational direction P1 at constant angular velocity.

Subsequently, the workpiece 50 rotates in the rotational direction P1 as shown in FIG. 3B to FIG. 3F, and the controller 7 controls the feeder 4 to move the cutting edge 6a along the circumference of the offset virtual circle V2 in the rotational direction P2 synchronized with the rotation of the workpiece 50. Note that a reference numeral 52 is added in FIG. 3A to FIG. 3F to a point or position on the outer surface of the workpiece 50 which is the highest position in the height direction in a state shown in FIG. 3A to show the rotational position of the workpiece 50. Then, the controller 7 moves the main spindle 2 in the Z-direction (see FIG. 1) so that the cutting edge 6a contacts the workpiece 50 to form an inner surface 61 in accordance with the rotation of the workpiece 50. The inner surface 61 defines the hole 60 shown in a solid line in FIG. 3B to FIG. 3F.

According to the automatic lathe 1 as configured above and the method for processing by the automatic lathe 1, the eccentric hole 60 can be processed with a simple setting in which the input receiver 8 receives the inputs regarding the distance D and the radius R when forming into the workpiece 50 the hole 60 having the radius R and the center C3 at the position eccentric from the shaft center C1 of the workpiece 50 by the distance D in the radial direction. In addition, according to the automatic lathe 1, the eccentricity (the distance D) of the hole 60 and/or the radius R can be easily changed based on the distance D and the radius R received by the input receiver 8. Accordingly, it is unnecessary to input the coordinate positions of the cutting edge 6a every time the eccentricity and/or the radius R change, which can substantially reduce time and effort.

Further, according to the automatic lathe 1, cost can be reduced compared to conventional automatic lathes since it only requires to change the contents of the control by the controller 7 but does not require an expensive spindle. Moreover, the automatic lathe 1 can also form a tapered portion having steps inside the workpiece and form thread grooves on the inner surface of the workpiece by using a conventional thread cutting tool for an inner diameter when processing or machining the inner diameter of the workpiece at a position eccentric from the center of the material.

Note that since in the machine tool of the present disclosure, the process is performed with the tool which turns in an eccentric state synchronized with the rotation of the workpiece about the shaft center, the actual position of the cutting edge of the tool while processing may be at a position slightly (equal to or smaller than 1 [mm]) deviated from an intended position set for the process depending on conditions such as the rotational speed of the workpiece, etc. In the automatic lathe 1 of this embodiment, since the cutting edge 6a is moved to the coordinate positions (x, y) synchronized with the rotation of the workpiece about the shaft center, for example, the eccentric position of the hole 60 which is formed by the actual process may slightly deviate from the set eccentric position when controlling the turn of the tool by means of an arc interpolation control of X and Y axes, and processing the hole 60 having the radius R at the set eccentric position.

Then, when the operation of the machine tool and the turn of the tool stop after the termination of the process, the position of the cutting edge of the tool returns to the intended set position. Accordingly, the cutting edge of the tool interferes with or cuts into the processed surface of the hole which is formed and/or a processed surface of a protrusion depending on a position at which the operation of the machine tool stops and resultingly the processed surface may be damaged. Even if the processed surface may not be damaged, frictional resistance due to the contact may occur when returning the tool to the intended set position along the axial or shaft direction from a state in which the tool contacts the processed surface after the termination of the process.

Accordingly, in the automatic lathe 1 and the method for processing by the automatic lathe 1 according to this embodiment, the controller 7 controls the feeder 4 such that the cutting edge 6a of the cutting tool 6 is moved in a direction away from the inner surface 61 (processed surface) of the hole 60 in the workpiece 50 after terminating the process to the hole 60 of the workpiece 50 (cutting operation to the processed surface) and before stopping the rotation of the workpiece 50 and the movement of the cutting tool 6. For example, after the termination of the process and before the stop of the rotation, the controller 7 can move the cutting edge 6a of the cutting tool 6 along the track of a value R' which is smaller than the radius R stored in the NC program ($\Delta R = R - R'$ is a value larger than the slight distance along which the cutting edge 6a of the cutting tool 6 escapes during the rotation).

Figure 3G:
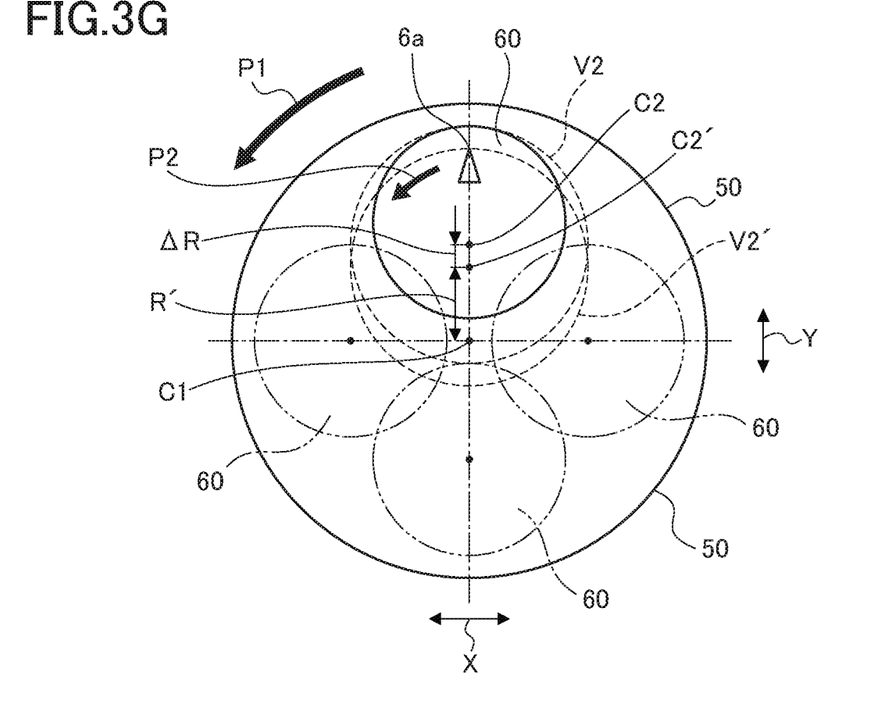
FIG. 3G is a front view, which corresponds to FIG. 2, illustrating the positional relation between a second offset virtual circle set by a controller and a hole formed into the workpiece.

FIG. 3G is a front view, which corresponds to FIG. 2, illustrating the positional relation between a second offset virtual circle V2' set by the controller 7 and the hole 60 formed into the workpiece 50. As shown in FIG. 3G, the controller 7 sets the second offset virtual circle V2'. The second offset virtual circle V2' is a virtual circle having the radius of the distance D and a center CT at a position offset from the shaft center C1 by the value R'. In other words, the second offset virtual circle V2' is a circle in which the offset virtual circle V2 shown in FIG. 2 is moved closer to the shaft center C1 by the value $\Delta R$.

The controller 7 controls the feeder 4 such that the cutting edge 6a turns or moves along the circumference of the second offset virtual circle V2'. The track of the cutting edge 6a along the circumference of the second offset virtual circle V2' is within an area inward away from the inner surface 61 (processed surface) of the hole 60 formed into the workpiece 50 which synchronously rotates. Accordingly, the cutting edge 6a moves without contacting the inner surface 61.

Then, the automatic lathe 1 and the turn of the cutting tool 6 stop, and the cutting edge 6a of the cutting tool 6 returns to the intended set position. However, the cutting edge 6a does not contact the inner surface 61 of the hole 60 when the turn stops and the cutting edge 6a returns to the intended position since the cutting edge 6a has been moved away from the inner surface 61 of the workpiece 50 before the turn stops. Accordingly, the cutting edge 6a of the cutting tool 6 can be prevented from damaging the inner surface 61 of the hole 60. Note that the machine tool according to the present disclosure is not limited to one in which the cutting edge of the tool is controlled to move away from the processed surface after the termination of the process and before the stop of the turn. It is not required to control the cutting edge to move away from the processed surface if the cutting edge of the tool does not contact the processed surface of the workpiece at a time when the turn stops after the termination of the process.

In the automatic lathe 1 in this embodiment, the eccentric distance D of the eccentric hole 60 to be formed into the workpiece 50 and the radius R of the hole 60 are input, and then the controller 7 sets the offset virtual circle V2 which becomes the track along which the cutting edge 6a of the cutting tool 6 moves. The control to move the cutting edge of the tool from the processed surface after the termination of the process and before the stop of the turn is not limited to the machine tool in which the controller sets the offset virtual circle, which becomes the track for the cutting edge of the cutting tool, with the inputs regarding the distance D and the radius R, but is applicable to any machine tools in which the tool turns synchronized with the rotation of the workpiece to form the eccentric portion in the workpiece.

(Variations)

FIG. 4A, FIG. 4B, FIG. 4C, FIG. 4D, FIG. 4E and FIG. 4F are front views, each of which corresponds to FIG. 2, illustrating the positional relation between the cutting edge 6a and the workpiece 50 set by the NC program.

In the automatic lathe 1 in the embodiment described above, the hole 60 is used as an example of the eccentric portion. However, as another example of the eccentric portion, a protrusion 70 such as a boss or a shaft having the eccentric distance D and the radius R may be used as shown in FIG. 4A, FIG. 4B, FIG. 4C, FIG. 4D, FIG. 4E, and FIG. 4F. As opposed to the case of the hole 60 in which the cutting edge 6a faces away from the shaft center C1, in this case, the cutting edge 6a is set to face toward the shaft center C1 as shown in FIG. 4A to FIG. 4F and an outer surface 71 of the protrusion 70 is formed by controlling the feeder 4 and the main spindle 2.

Note that when forming the protrusion 70, the feeder 4 is controlled to move the cutting edge 6a of the cutting tool 6 in a direction away from the outer surface (processed surface) of the protrusion 70 in the workpiece 50 after terminating the process of the protrusion 70 in the workpiece 50 (the cutting operation to the processed surface) and before stopping the rotation of the workpiece 50 and the movement of the cutting tool 6 since an amount of offset of the radius R of the protrusion 70 can be reduced. For example, after the termination of the process and before the stop of the rotation, the controller 7 can move the cutting edge 6a of the cutting tool 6 along the track of a value R" which is larger than the radius R stored in the NC program (ΔR'=R"−R is a value larger than the slight distance along which the cutting edge 6a of the cutting tool 6 escapes during the rotation).

Figure 4A:
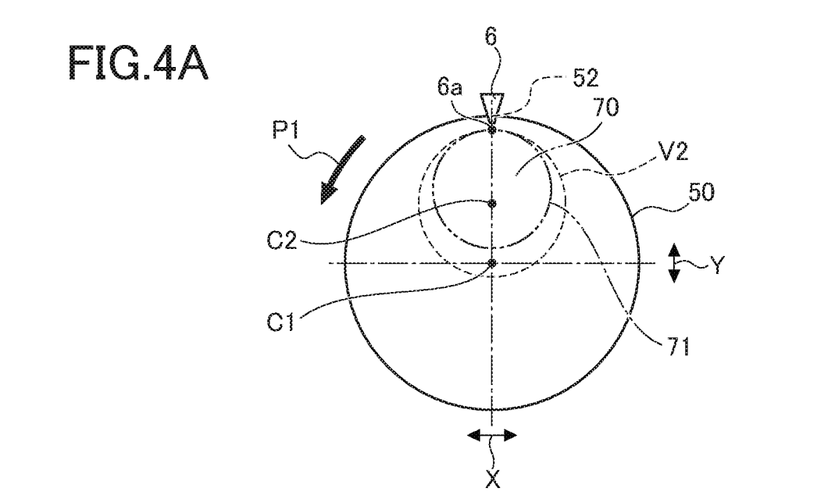
FIG. 4A is a front view, which corresponds to FIG. 2, illustrating the positional relation between the cutting edge of the cutting tool and the workpiece set by the NC program, and illustrating a state in which the cutting tool has moved to, for example, the twelve o'clock position (the highest position in the height direction shown in the figure) on the circumference of the offset virtual circle.
Figure 4B:
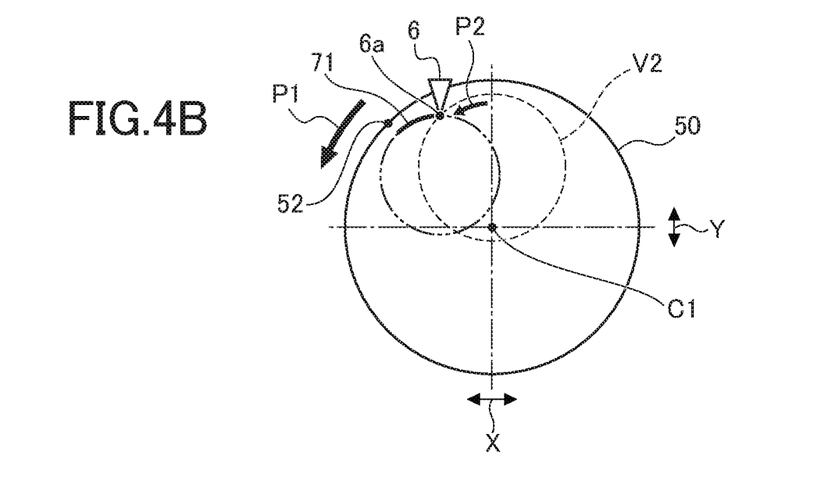
FIG. 4B is a front view, which corresponds to FIG. 2, illustrating the positional relation between the cutting edge of the cutting tool and the workpiece set by the NC program, and illustrating a state in which the cutting tool has moved to, for example, the ten o'clock and half position on the circumference of the offset virtual circle.
Figure 4C:
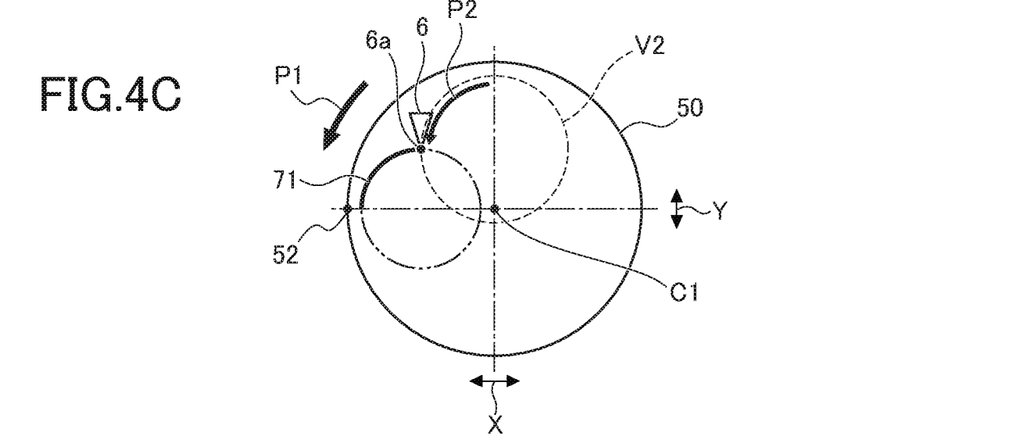
FIG. 4C is a front view, which corresponds to FIG. 2, illustrating the positional relation between the cutting edge of the cutting tool and the workpiece set by the NC program, and illustrating a state in which the cutting tool has moved to, for example, the nine o'clock position (the left end position in the left-right direction shown in the figure) on the circumference of the offset virtual circle.
Figure 4D:
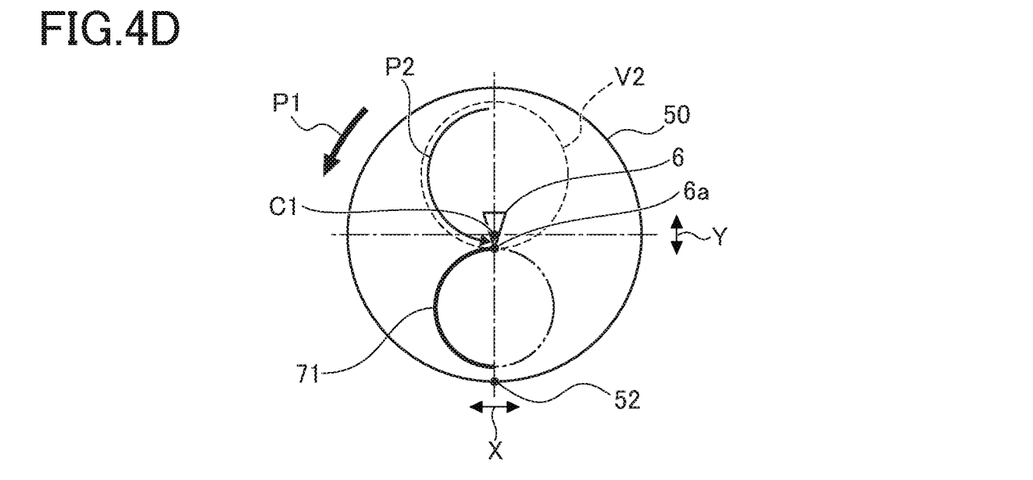
FIG. 4D is a front view, which corresponds to FIG. 2, illustrating the positional relation between the cutting edge of the cutting tool and the workpiece set by the NC program, and illustrating a state in which the cutting tool has moved to, for example, the six o'clock position (the lowest position in the height direction shown in the figure) on the circumference of the offset virtual circle.
Figure 4E:
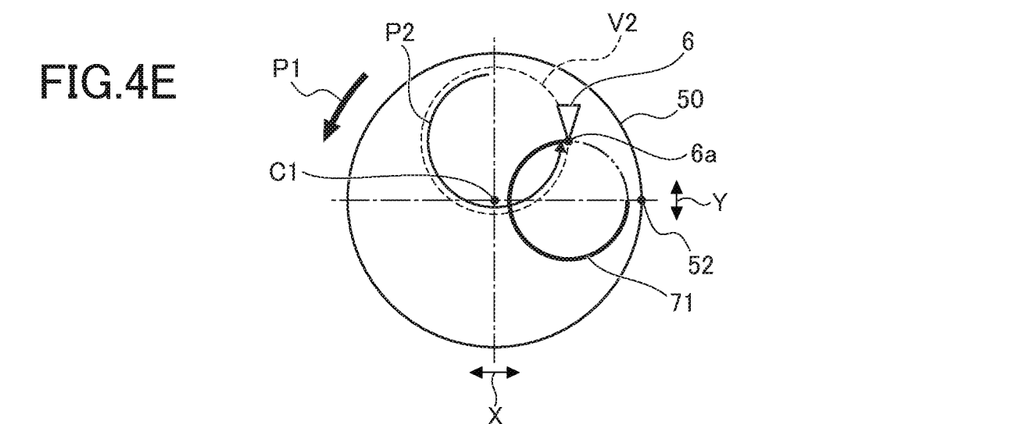
FIG. 4E is a front view, which corresponds to FIG. 2, illustrating the positional relation between the cutting edge of the cutting tool and the workpiece set by the NC program, and illustrating a state in which the cutting tool has moved to, for example, the three o'clock position (the right end position in the left-right direction shown in the figure) on the circumference of the offset virtual circle.
Figure 4F:
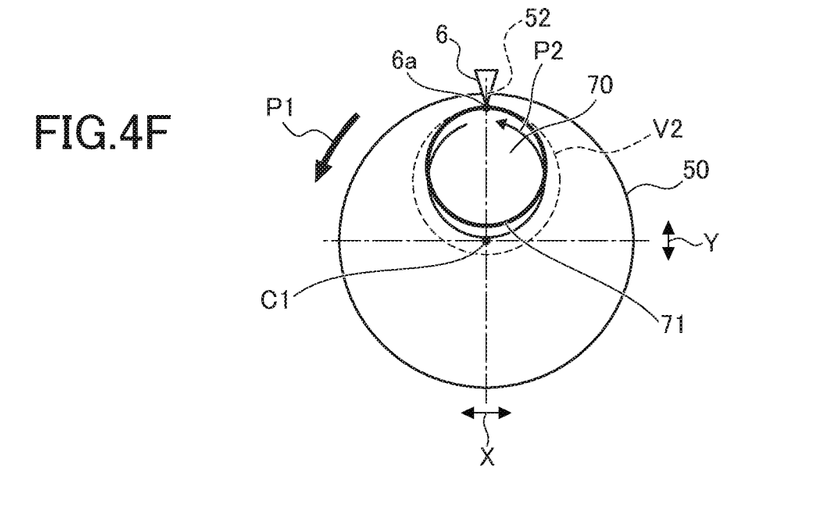
FIG. 4F is a front view, which corresponds to FIG. 2, illustrating the positional relation between the cutting edge of the cutting tool and the workpiece set by the NC program, and illustrating a state in which the cutting tool has moved to, for example, the twelve o'clock position on the circumference of the offset virtual circle.
Figure 4G:
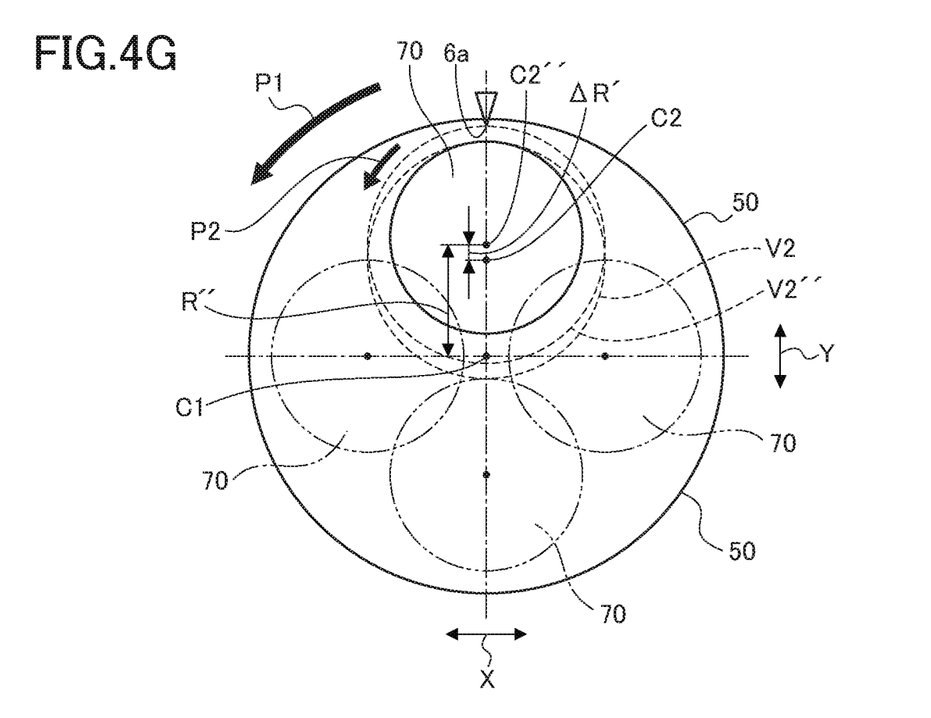
FIG. 4G is a front view, which corresponds to FIG. 2, illustrating the positional relation between the second offset virtual circle set by the controller and a protrusion formed in the workpiece.

FIG. 4G is a front view, which corresponds to FIG. 2, illustrating the positional relation between a second offset virtual circle V2" set by the controller 7 and the protrusion 70 formed in the workpiece 50. The controller 7 sets the second offset virtual circle V2" as shown in FIG. 4G. The second offset virtual circle V2" is a virtual circle having a radius corresponding to the distance D and the center C2" at a position offset from the shaft center C1 by the value R". In other words, the second offset virtual circle V2" is a circle in which the offset virtual circle V2 shown in FIG. 2 is moved away from the shaft center C1 by the value ΔR' (=R"−R).

The controller 7 controls the feeder 4 so that the cutting edge 6a turns or moves along the circumference of the second offset virtual circle V2". The track of the cutting edge 6a along the circumference of the second offset virtual circle V2" is within an area outward away from the outer surface 71 (processed surface) of the protrusion 70 formed in the workpiece 50 which synchronously rotates. Accordingly, the cutting edge 6a moves without contacting the outer surface 71.

Then, the automatic lathe 1 and the turn of the cutting tool 6 stop, and the cutting edge 6a of the cutting tool 6 returns to the intended set position. However, the cutting edge 6a does not contact the outer surface 71 of the protrusion 70 when the turn stops and the cutting edge 6a returns to the intended position since the cutting edge 6a has been away from the outer surface 71 of the workpiece 50 before the turn stops. Accordingly, the cutting edge 6a of the cutting tool 6 can be prevented from damaging the outer surface 71 of the protrusion 70. Note that it is not required to control the cutting edge to move away from the processed surface if the cutting edge of the tool does not contact the outer surface 71 of the protrusion 70 at a time when the turn stops after the termination of the process.

In the embodiment described above and the variation, it is described that the radius r of the workpiece 50, the distance D of the eccentricity, and the radius R of the hole 60 satisfy the magnitude relationship $(D+R)<r$. However, in the present disclosure, the radius r of the workpiece 50, the distance D of the eccentricity, and the radius R of the hole 60 are not limited to the above magnitude relationship. Specifically, the radius r of the workpiece 50, the distance D of the eccentricity, and the radius R of the hole 60 may have a magnitude relationship $(D+R)\geq r$. Accordingly, the center C3 of the hole 60 may be set in the outside of the outer circumference of the workpiece 50 ($D>r$), or the radius R of the hole 60 may be larger than the radius r of the workpiece 50 ($R>r$).

In these cases, in the workpiece 50, an eccentric portion in the shape of a cutout in which a part of the hole 60 has an opening or cutout is formed on the outer circumference of the workpiece 50 instead of the hole 60 in the shape of a true circle. In this regard, however, it is necessary to satisfy the relationship $(D-R)<r$ since the cutting edge 6a does not contact the workpiece 50 so that the cutout cannot be formed if the relationship is $(D-R)\geq r$. In addition, it is necessary to satisfy the relationship $(D-R)>-r$ since the cutting edge 6a cuts the whole surface of the workpiece 50 to shorten the workpiece 50 if the relationship is $(D-R)\leq -r$.

From the above, the controller 7 determines whether a condition $-r<(D-R)<r$ is satisfied with regard to the distance D and the radius R, which are input to the input receiver 8, in relation to the radius r of the workpiece 50, and controls the main spindle 2 and the feeder 4 as described above when the condition is satisfied. On the other hand, the controller 7 does not control the main spindle 2 and the feeder 4 when the condition is not satisfied but alerts an error of the input value or the like.

The automatic lathe 1 in this embodiment moves the cutting tool 6 in accordance with the rotation of the workpiece such that the cutting edge 6a turns once along the circumference of the offset virtual circle V2 in the rotational direction P2 per one rotation of the workpiece 50 about the shaft center C1 in the rotational direction P1. However, the machine tool and the method for processing by the machine tool according to the present disclosure is not limited to one in which the movement of the cutting tool 6 is related to the one rotation of the workpiece 50.

The automatic lathe 1 in this embodiment is a so-called main spindle platform moving type machine tool in which the main spindle 2 moves in the Z-direction to feed the workpiece 50 in the shaft center C1 direction. However, according to the present disclosure, the machine tool and the method for processing by the machine tool is not limited to the main spindle platform moving type machine tool but the automatic lathe may be a so-called main spindle platform fixed type machine tool in which the main spindle does not move in the Z-direction but the tool moves in the Z-direction instead. Further, the machine tool and the method for processing by the machine tool according to the present disclosure are not limited to the lathe but applicable to other machine tools.

The invention claimed is:

1. A machine tool for forming a rounded portion on a workpiece, the machine tool comprising:
   a main spindle configured to rotate the workpiece about a shaft center thereof;
   a tool configured to process the workpiece;
   a feeder configured to move the tool;
   an input receiver configured to receive an input from an operator regarding a distance D and a radius R for forming the rounded portion, the radius R defining a radius of the rounded portion and the distance D defining a distance between a center of the rounded portion and the shaft center of the workpiece; and
   a controller configured to:
      set a virtual circle having a radius equal to the distance D,
      set an offset virtual circle having a center at a position in which a center of the virtual circle is offset from the shaft center of the workpiece by a distance equal to the radius R in the radial direction of the workpiece, and
      move the tool, without rotating the tool, along a circumference of the offset virtual circle in synchronization with a rotation of the workpiece by the main spindle to form the rounded portion of the workpiece,
   wherein the rounded portion of the workpiece has a radius equal to the radius R and a center at a position offset from the shaft center of the workpiece by the distance D.

2. The machine tool according to claim 1, wherein the rounded portion is a hole formed within the workpiece.

3. The machine tool according to claim 1, wherein the rounded portion is a protrusion formed on the workpiece.

4. The machine tool according to claim 1, wherein the controller is configured to move the tool in a direction away from a processed surface of the workpiece after terminating the process of forming the rounded portion of the workpiece and before stopping the rotation of the workpiece and movement of the tool.

5. The machine tool according to claim 1, wherein the controller is configured to determine whether a condition $-r<(D-R)<r$ is satisfied with regard to the distance D and the radius R input to the input receiver in relation to a radius r of the workpiece, and configured to control movement of the tool along the circumference of the virtual circle relative to the feeder, in response to the condition being satisfied.

6. A method for forming a rounded portion of on a workpiece by a machine tool, comprising:
   receiving an input from an operator regarding a distance D between a shaft center of the workpiece and a center of the rounded portion, and a radius R of the rounded portion;
   setting a virtual circle having a radius equal to the distance D;
   setting an offset virtual circle in which a center of the virtual circle is offset from the shaft center of the workpiece by a distance equal to the radius R in the radial direction of the workpiece;
   moving a tool in a direction perpendicular to the shaft center of the workpiece that is rotated about the shaft center by a main spindle of the machine tool; and
   moving the tool, without rotating the tool, along a circumference of the offset virtual circle in synchronization with a rotation of the workpiece by the main spindle to form the rounded portion of the workpiece.

7. The method according to claim 6, further comprising:
   moving the tool in a direction away from a processed surface of the workpiece after terminating the process of forming the rounded portion of the workpiece and before stopping a rotation of the workpiece and movement of the tool.

* * * * *

UNITED STATES PATENT AND TRADEMARK OFFICE
CERTIFICATE OF CORRECTION

PATENT NO. : 10,661,349 B2  
APPLICATION NO. : 15/775681  
DATED : May 26, 2020  
INVENTOR(S) : Hikaru Takahashi Page 1 of 1

It is certified that error appears in the above-identified patent and that said Letters Patent is hereby corrected as shown below:

In the Specification

In Column 6, Line 37, delete "CT" and insert --C2'--.

In the Claims

In Column 10, Line 15 (Approx.), Claim 6, after "portion" delete "of".

Signed and Sealed this  
Eighth Day of December, 2020

Andrei Iancu  
*Director of the United States Patent and Trademark Office*